(12) United States Patent
Lewis

(10) Patent No.: US 10,917,250 B2
(45) Date of Patent: Feb. 9, 2021

(54) CHALLENGE/RESPONSE SYSTEM

(71) Applicant: MERCURY SYSTEMS, INC., Andover, MA (US)

(72) Inventor: James M. Lewis, Moulton, AL (US)

(73) Assignee: Mercury Systems, Inc., Andover, MA (US)

( * ) Notice: Subject to any disclaimer, the term of this patent is extended or adjusted under 35 U.S.C. 154(b) by 234 days.

(21) Appl. No.: 15/596,494

(22) Filed: May 16, 2017

(65) Prior Publication Data

US 2018/0337789 A1    Nov. 22, 2018

(51) Int. Cl.
| | |
|---|---|
| *G06F 21/00* | (2013.01) |
| *H04L 9/32* | (2006.01) |
| *H04L 29/06* | (2006.01) |
| *H04L 9/08* | (2006.01) |

(52) U.S. Cl.
CPC .......... *H04L 9/3271* (2013.01); *H04L 9/0869* (2013.01); *H04L 9/3278* (2013.01); *H04L 63/0428* (2013.01); *H04L 2209/08* (2013.01)

(58) Field of Classification Search
CPC . H04L 63/0428; H04L 9/3271; H04L 9/3278; H04L 2209/08; H04L 9/0869
See application file for complete search history.

(56) References Cited

U.S. PATENT DOCUMENTS

| | | | | |
|---|---|---|---|---|
| 8,516,269 B1* | 8/2013 | Hamlet | ................ | G06F 21/445 340/5.8 |
| 8,694,778 B2* | 4/2014 | Teuwen | ................ | H04L 9/3278 713/168 |
| 8,782,396 B2* | 7/2014 | Ziola | ................ | G06F 21/31 713/155 |
| 8,868,923 B1* | 10/2014 | Hamlet | ................ | G06F 21/00 326/8 |
| 2002/0120575 A1* | 8/2002 | Pearson | ................ | G06F 21/57 705/51 |
| 2007/0157023 A1* | 7/2007 | Kotzin | ................ | H04L 63/0853 713/168 |
| 2008/0016349 A1* | 1/2008 | Kahn | ................ | H04N 21/4181 713/168 |
| 2011/0234241 A1* | 9/2011 | Lewis | ................ | H01L 23/576 324/649 |
| 2012/0008767 A1* | 1/2012 | Smith | ................ | H04L 9/0631 380/28 |
| 2013/0276151 A1* | 10/2013 | Lewis | ................ | G06F 21/70 726/34 |
| 2015/0188718 A1* | 7/2015 | Falk | ................ | G09C 1/00 380/278 |
| 2015/0207627 A1* | 7/2015 | Yamamoto | ................ | H04L 9/32 713/168 |
| 2018/0152306 A1* | 5/2018 | Lu | ................ | G09C 1/00 |
| 2018/0176025 A1* | 6/2018 | Suresh | ................ | H04L 9/3278 |
| 2018/0309574 A1* | 10/2018 | Lyubashevsky | ...... | H04L 9/3093 |

* cited by examiner

*Primary Examiner* — Kendall Dolly

(74) *Attorney, Agent, or Firm* — Kacvinsky Daisak Bluni, PLLC

(57) ABSTRACT

A challenge/response system separates a physically unclonable function from the challenge/response. Bits in a challenge are used to qualify random data values. The random data values are permuted to generate a result. The result is used to encrypt a response that is sent in reply to the challenge. Additional permuting mechanisms may be used to further obfuscate the response.

37 Claims, 18 Drawing Sheets

| 702 | | | | | 704 |
|---|---|---|---|---|---|
| 0 | EF | 21 | 1A | B7 | 18 |
| 1 | 3C | 58 | 31 | F1 | 15 |
| 2 | 6D | C4 | D3 | D4 | 17 |
| 3 | 09 | 07 | 58 | 6D | 13 |
| 4 | D9 | FA | 4B | 24 | 17 |
| 5 | 16 | FB | 6F | E8 | 20 |
| 6 | C2 | 36 | EF | 9F | 20 |
| 7 | 48 | B9 | D5 | 3D | 17 |

*Fig. 7*

CHALLENGE/RESPONSE SYSTEM

BACKGROUND

Authentication seeks to verify that a party is who they represent that they are. One form of authentication is challenge/response authentication. With challenge/response authentication, a first party, designated as a challenger, issues a challenge to a second party that seeks to be authenticated. The challenge may be viewed as a question for which a valid answer must be provided. The valid answer is contained in the response that is sent from the responder party to the challenger in order for the responder to be authenticated. If a valid answer is provided, the responder is authenticated. Both the challenge and the response may be encrypted, and only the two parties involved know the proper challenge/response pair.

SUMMARY

In accordance with an exemplary embodiment, a method is performed by a computational device as part of a challenge/response protocol. Per this method, a challenge is received at the computational device. At least a portion of the challenge is used to qualify random values held in a storage of the computational device for use in generating a response to the challenge. The qualified random values are permuted to generate a response. The response may be used as an encryption key to encrypt a message, and the encrypted message may be output from the computational device for a challenger in reply to the challenge.

The permuting may comprise permuting the permuted qualified random values within an additional value, such as the output of a physically unclonable function (PUF). The challenge may be permuted with another value that is used in the qualifying. This value may be an output of a PUF. The permuting may be performed by performing exclusive OR operations on the qualified random values, by adding the random values or by applying other mathematic permutation methods.

In a case where the challenge has a zero value, the challenge may be modified to have a different value.

In some embodiments, the encrypted message may be permuted with an output of a PUF, and the permuted encrypted message may be what is sent to the challenger.

The computational device may include processing logic, such as a microprocessor that performs the qualifying, the permuting and the sending. The computational device may include hardware logic, such as a field programmable logic array (FPGA) or an application specific integrated circuit (ASIC) that performs the qualifying, the permuting and the sending.

In accordance with an exemplary embodiment, a non-transitory computer-readable storage media holds instructions that when executed on processing logic perform a number of operations. These operations include receiving a challenge at a computational device. At least a portion of the challenge is used to qualify random values held in storage of the computational device for use in generating response to the challenge. The qualified random values are permuted to generate a result. A message may be encrypted using the response as an encryption key. The encrypted message is output from the computational device for a challenger in reply to the challenge.

In accordance with another embodiment, a device includes storage for storing random values and processing logic. The processing logic receives a challenge and uses at least a portion of the challenge to qualify at least one of the random values stored in the storage for use in generating a response to the challenge. The processing logic permutes the qualified random values to generate a response. The processing logic may encrypt a message using the response as an encryption key and may output the encrypted message for a challenger in reply to the challenge.

BRIEF DESCRIPTION OF THE DRAWINGS

FIG. 5A shows a table illustrating how random values may be qualified and permuted in an exemplary embodiment.

FIG. 5B shows a table of values that are qualified using a challenge and permuted for a challenge value of 254 decimal.

FIG. 5C shows a table of values that are qualified by a challenge and permuted for a challenge having a value of 246 decimal.

FIG. 7 shows an example of random data values encoded in hexadecimal for use in exemplary embodiments.

DETAILED DESCRIPTION

Exemplary embodiments described herein concern challenge/response systems. The challenge/response systems of exemplary embodiments described herein produce a desired variation in generated responses from each change in the challenge. The challenge/response systems of exemplary embodiments do not have the traditional problem of being noisy and enable the generation of a large number of challenge/response pairs without requiring excessive number of random values to be stored. Moreover, the approach of the challenge/response systems of the exemplary embodiments is deterministic in that if the challenge value is known, the result is reliably and steadily predicted. Still further, the approach is customizable, as long as the random values are known, the response for each challenge is known and can be predicted.

Figure 1:
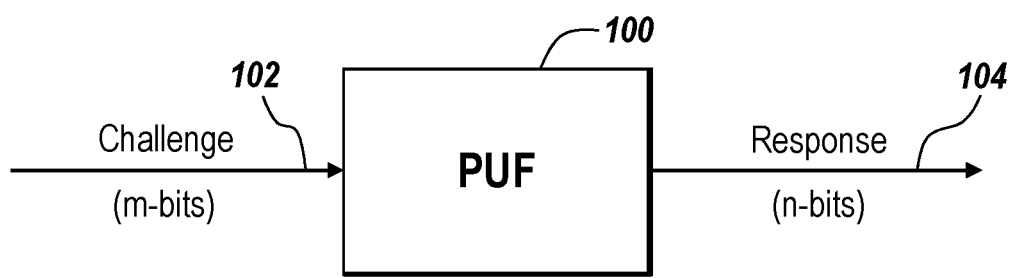
FIG. 1 shows use of a conventional physically unclonable function (PUF).

FIG. 1 depicts a conventional challenge/response system that deploys a physically unclonable function (PUF) 100. The PUF 100 receives a challenge 102 that may be m bits in length, where m is an integer. The PUF 100 produces a response 104 that is n bits in length, where n is an integer. The response is unique to the challenge but cannot be derived from the challenge.

Ideally any change in the challenge should result in a significant change in the response. For example, changing one bit of the challenge should result in a change in about half of the bits in the response. Unfortunately, many conventional PUFs do not have this desired degree of variability between the challenge and resulting response.

Another drawback of the conventional challenge/response systems is that the traditional PUF is noisy such that the response that is generated includes noise that may change some bit values in the response. To account for the noise in some conventional systems, the response is often judged to be close enough despite the changed bit values instead of being an exact match with the correct response value.

An additional drawback of conventional challenge/response systems is that they produce the same response for multiple different challenge values.

A further drawback of conventional challenge/response systems is that they require enrollment of a large number of values. The PUF must be tested for each challenge/response pair, and the pairs must be stored in a secure database. The database may have to store millions of large values (256 bits to 1024 bits in length each) to ensure that a challenge is not used twice.

The exemplary embodiments may overcome these drawbacks of conventional challenge/response systems that rely on a PUF. The exemplary embodiments do not rely upon the PUFs but rather separate the challenge/response from the PUF. The exemplary embodiments produce a large number of unique yet random challenge/response pairs independent of a PUF. In addition, the exemplary embodiments may provide a large number of challenge/response pairs while only requiring a reasonable amount of storage (e.g., 64 k bits of storage).

The exemplary embodiments also adopt an approach that is stable. The same response is produced each time that a same challenge is input.

Figure 2:
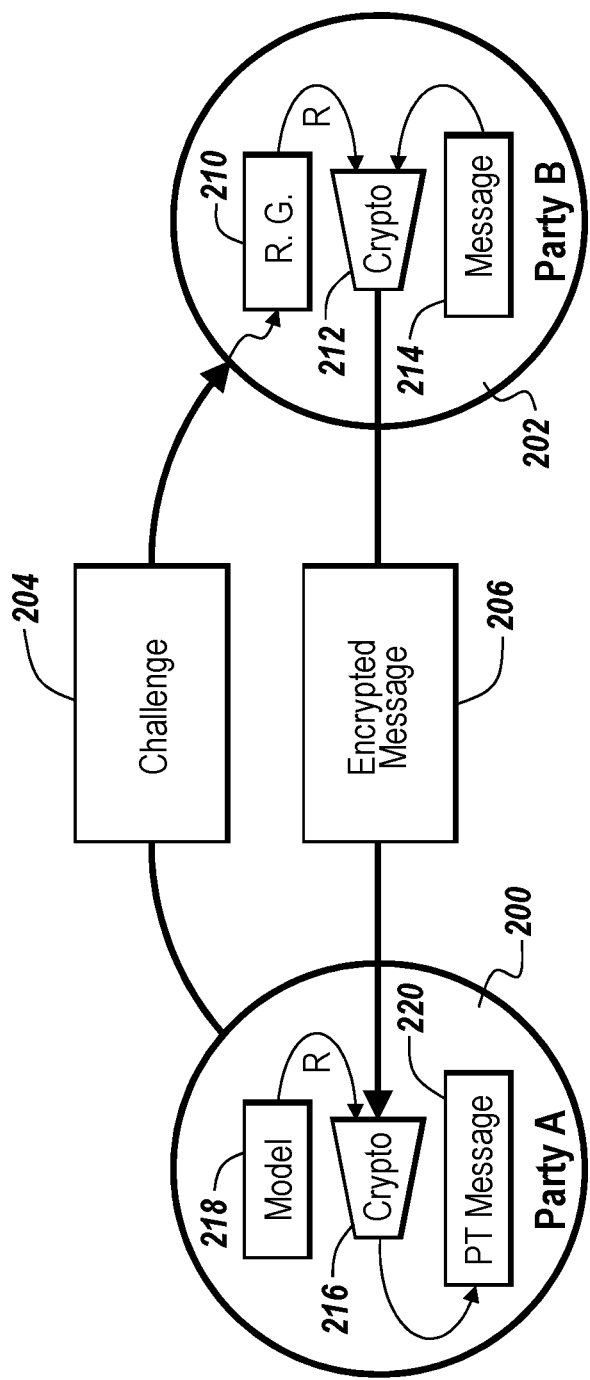
FIG. 2 illustrates components and message flow for a challenge/response system in accordance with an exemplary embodiment.

FIG. 2 illustrates an example of an interaction with a challenge/response system of an exemplary embodiment. Party A 200 (the "challenger") issues a challenge 204 that is sent to party B 202 (the "responder"). Party B 202 has a response generator 210 that processes the challenge and generates a response that is provided to a cryptographic system 212. The cryptographic system 212 may be implemented in hardware, software of a combination thereof. The cryptographic system 212 may use any of a number of different encryption methods, including the Advanced Encryption Standard (AES). The cryptographic system 212 may encrypt a message 214 using the response generated by the response generator 210 as a cryptographic key. The cryptographic system 212 sends the encrypted message 206 back to party A 200. Party A 200 has a model 218 of the response generator 210 that was used to encrypt the message. This model 218 is used to generate a response, and the response is used by cryptographic system 216 to decrypt the message 206. If the decryption results in a properly decrypted message 220 having proper content, the party B 202 is authenticated. Otherwise, the authentication fails.

Figure 3:
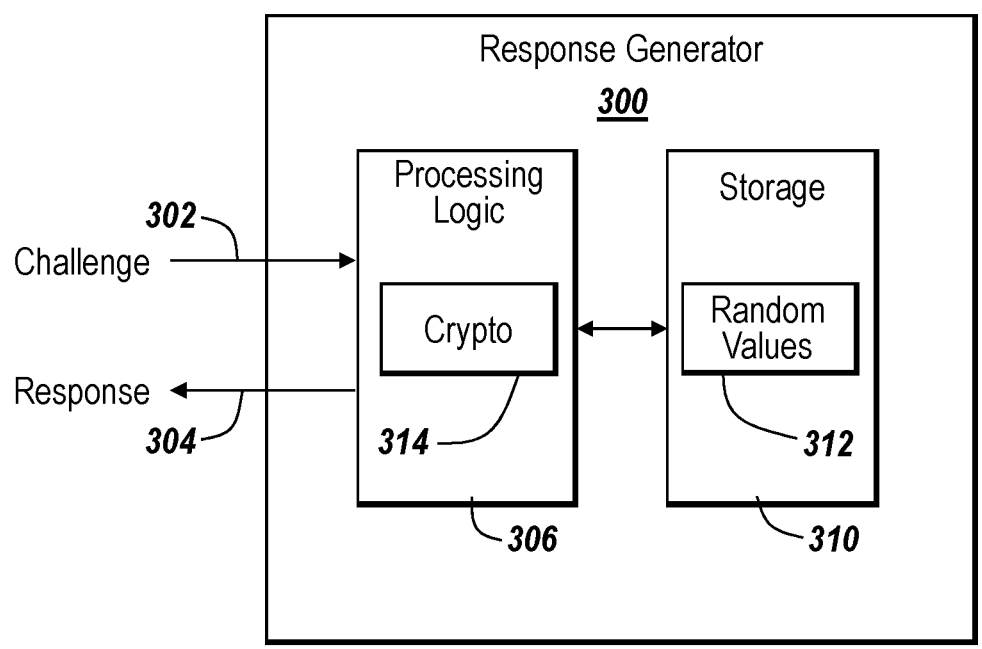
FIG. 3 illustrates components of a response generator for use in an exemplary embodiment.

FIG. 3 shows an example of components that may be found in a response generator 300 that generates a response to a challenge for such a challenge/response system. The response generator 300 receives a challenge 302 and generates an appropriate response 304 as described above relative to FIG. 2. Response generator 300 has processing logic 306 that may include a cryptographic system 314. The processing logic 306 has access to storage 310 that holds a number of things, including random values 312 that are used in response generation. Storage 310 may be included in the processing logic 306. Moreover, all of the components may be encapsulated in a physically protected package that is protected from physical hacking and reverse engineering.

Figure 4:
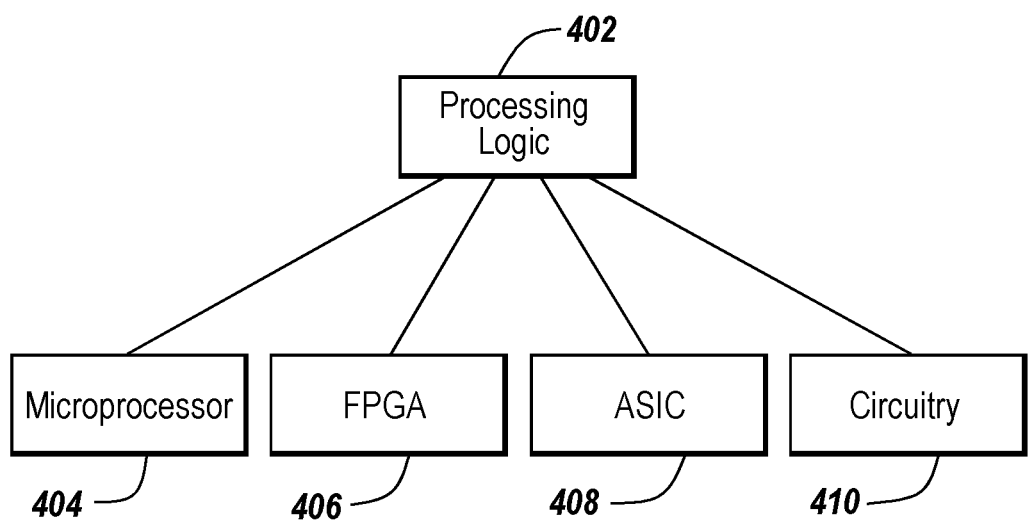
FIG. 4 illustrates various exemplary types of processing logic that may be used.

FIG. 4 shows an example of different types of processing logic that may be utilized in the exemplary embodiments. Processing logic 402 may include a microprocessor 404 that executes instructions for performing the appropriate processing to generate the response and message that is returned to the challenger. This may include but is not limited to the qualifying, permuting and encrypting that are required by the challenge/response system. Similarly, the processing logic may be realized as a field programmable array (FPGA) 406 or an application specific integrated circuit (ASIC) 408. Moreover, the processing logic 402 may be implemented in circuitry 410. Those skilled in the art will appreciate that numerous variations of these processing logic components 404, 406, 408 and 410 may be used. Moreover, this is not intended to be an exhaustive list of possible variations of processing logic that may be used.

Figure 5A:
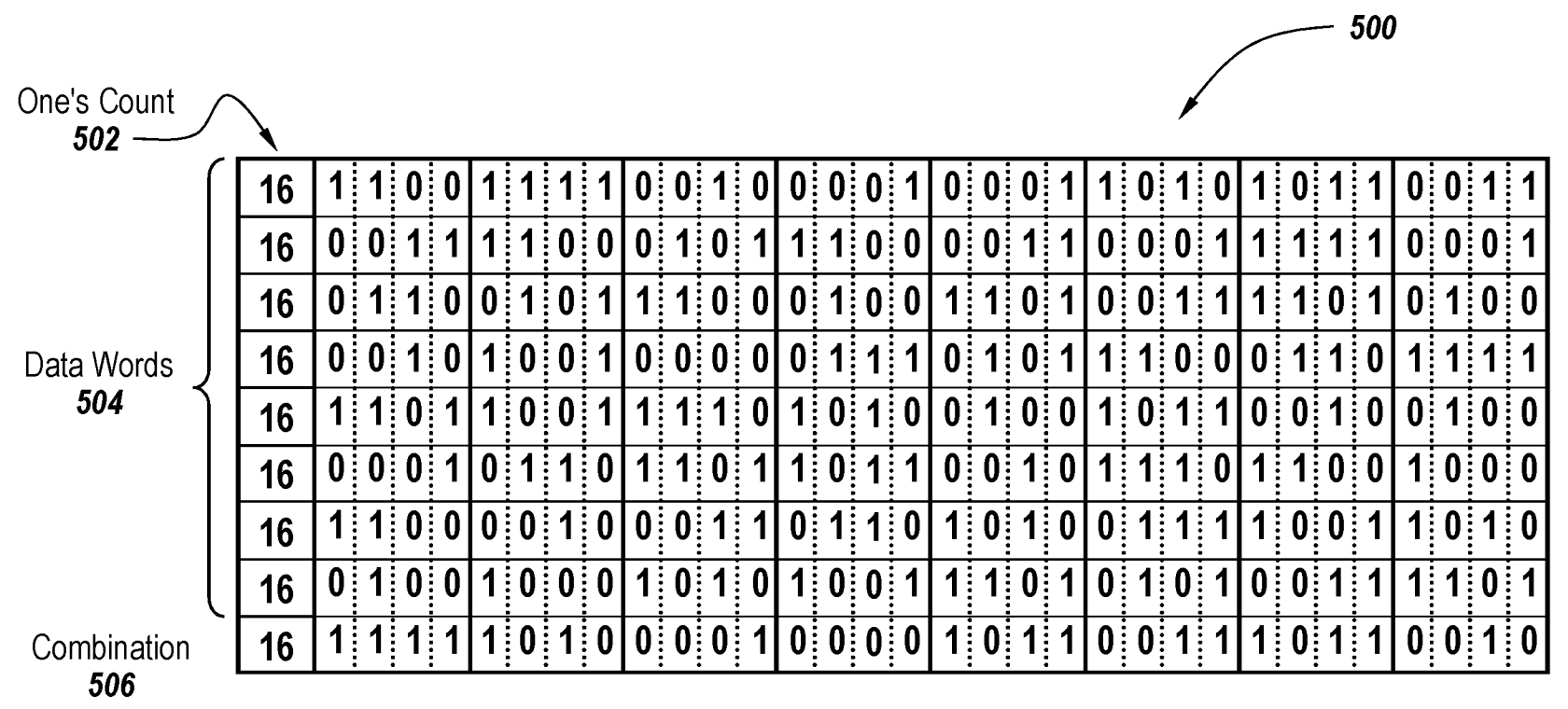

In order to understand the operation of the challenge/response system of the exemplary embodiments, it is helpful to consider a few examples. In the exemplary embodiments, the challenge is used to qualify random data values that are then permuted to generate a result. FIG. 5A shows an example of a table 500 of random data values that are used in an exemplary embodiment and the resulting permuted value. The table 500 in FIG. 5 shows eight random data words of 32 bits in length in binary format. The data words 504 are the random values extracted from a storage (such as 310 in FIG. 3). The first column 502 (designated as "One's Count") shows the number of one values in the data words. As will be discussed in more detail below, the qualified random data values then are permuted using a process, such as by performing an "exclusive OR" on the values or by adding the values. Those skilled in the art will appreciate that other permuting methods may be used. In the case depicted in FIG. 5A, the values have been exclusive ORed to produce the combination row 506 as a result.

Figure 5B:
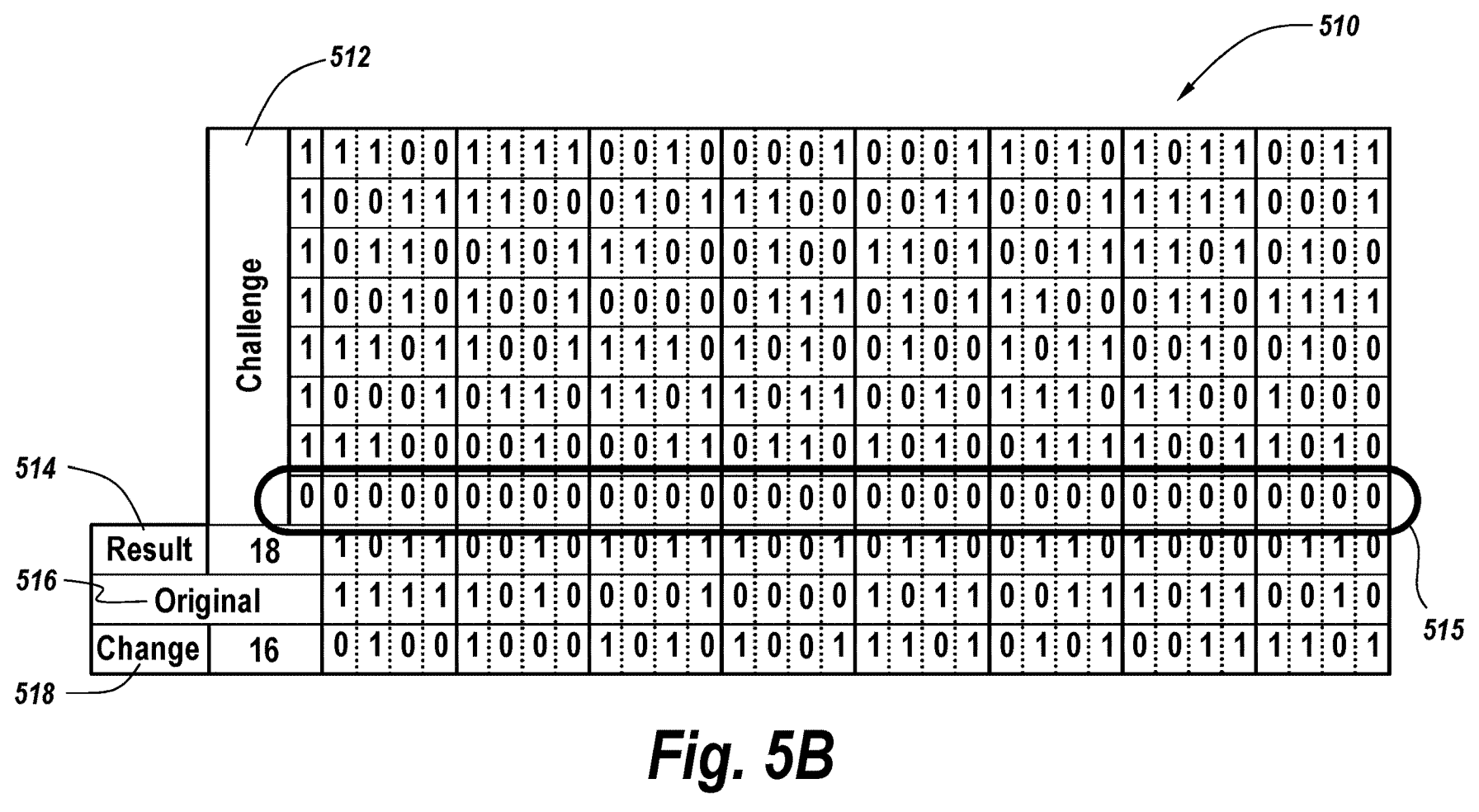

FIG. 5B shows an example of a similar table 510 where a challenge 512 is received. In the example shown in FIG. 5B, the challenge is equal to the binary version of the decimal value 254. As a result, the final row 515 is all zeros. The other rows containing random data values are qualified because the associated challenge bit value is one. The result of the permuting is shown in row 514. Row 516 shows the result from the example of FIG. 5A that originally was produced from these random values by performing a straight exclusive OR of these values. Row 518 shows the change between the original result (see 506 in FIG. 5A) resulting from the zero row 515 due to the zero value in the challenge. The change results in 16 bits being changed.

Figure 5C:
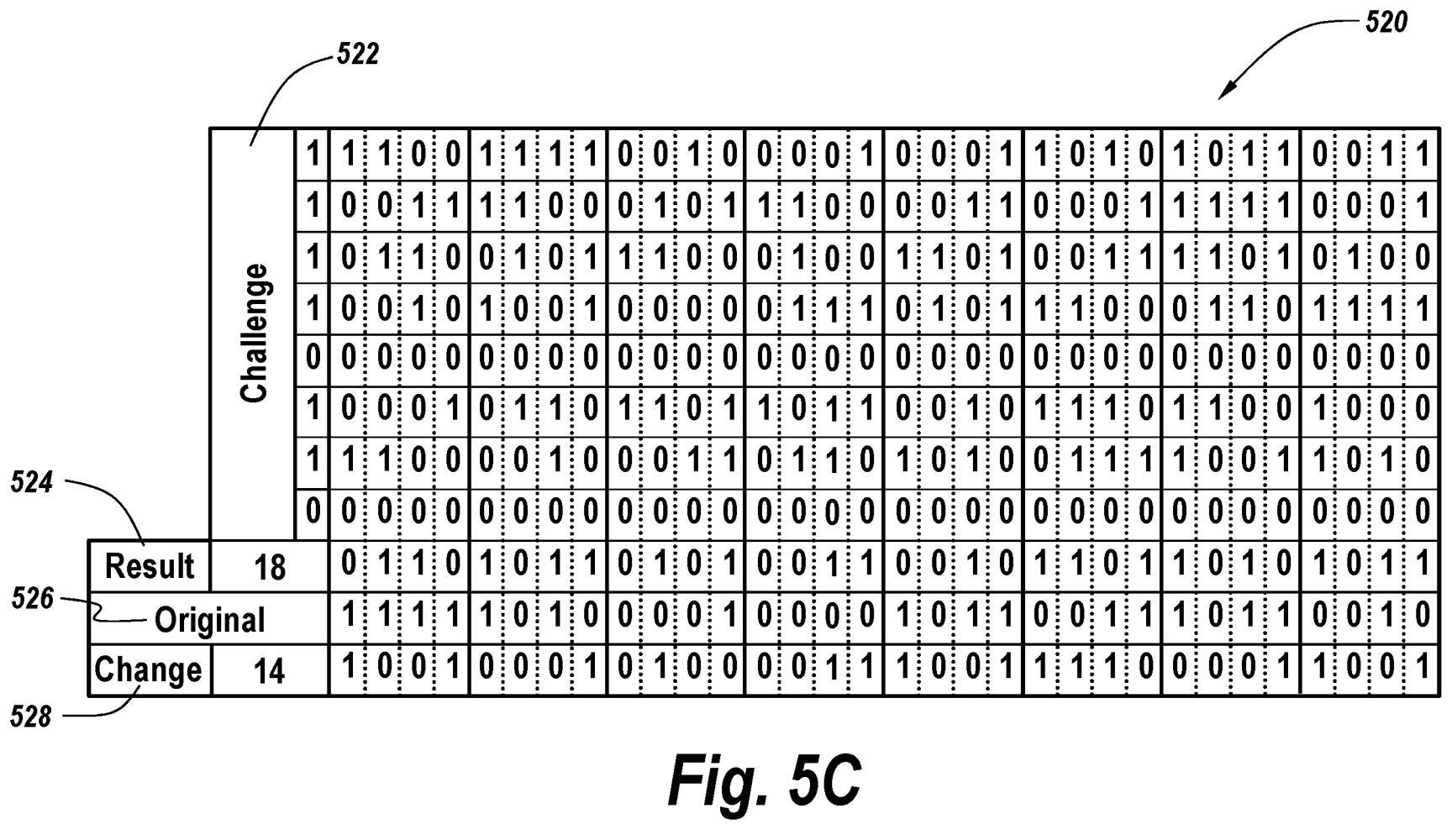

FIG. 5C shows a table 520 where the challenge 522 has been changed to have a decimal value of 246. The result 524 is shown, and the original value 526 is shown to illustrate the change 528 that results (a modification of 14 bits).

These tables 500, 510 and 520 help to illustrate that a change in a single field of the challenge results in significant changes in the response. As such, these examples illustrate the variability of the approach described herein.

Figure 6:
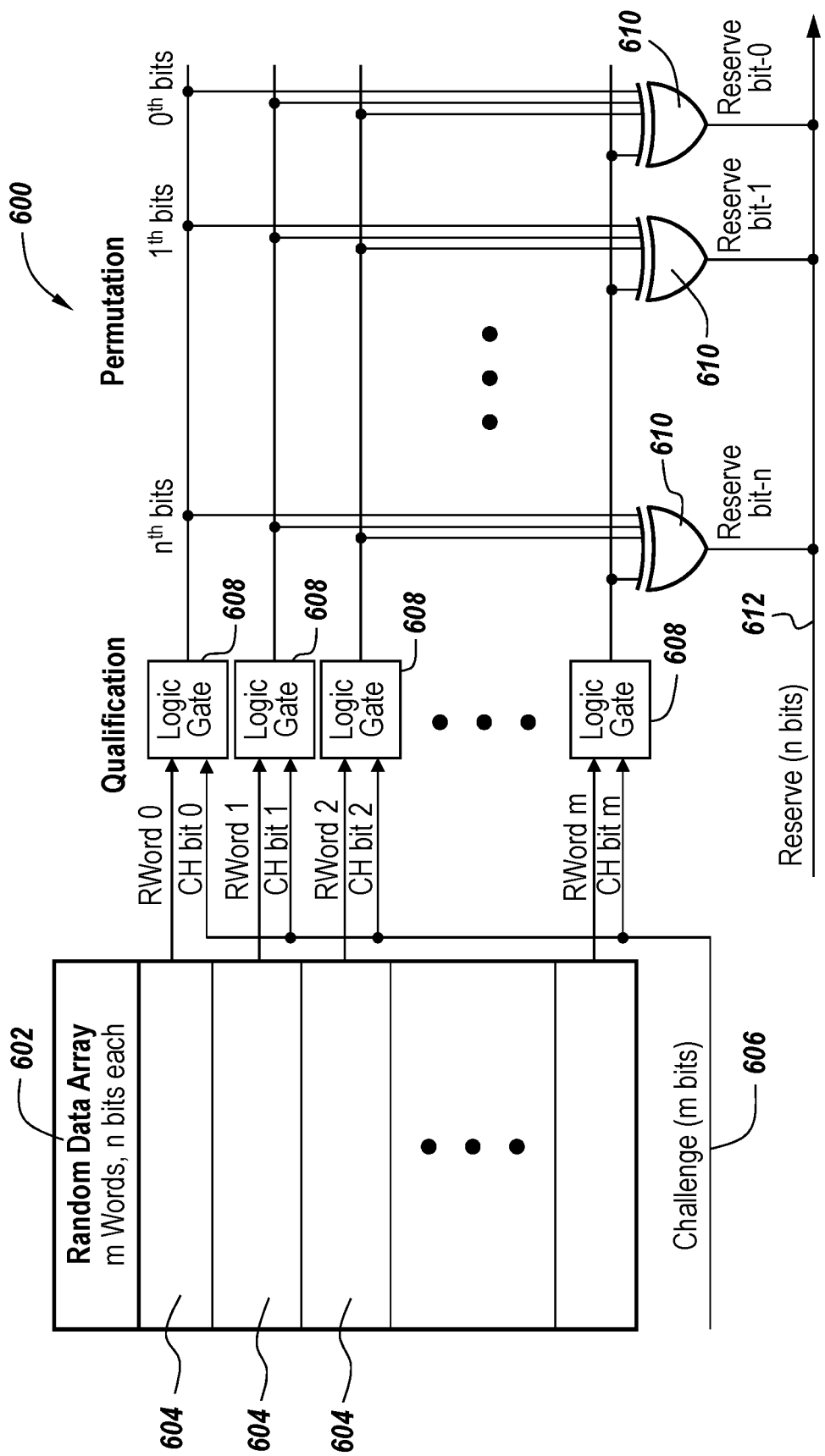
FIG. 6 illustrates components found in an exemplary system for performing the qualifying and permuting to yield a response in a response generator.

FIG. 6 shows a parallel response generator implementation 600 for generating a response. The response generator 600 includes a random data array 602 having fields 604 that each holds a random data value. The challenge 606 is m bits in length and acts as a qualifier to determine which random data fields 604 are qualified to be used in the permutation. The corresponding bit of the challenge is logically ANDed with the random data value (the random data value is n-bits in length) by logic gate 608. Hence, if the corresponding bit of the challenge is a one, the random data value is qualified, and if not, the random data value is disqualified. Other methods may be used to qualify values (e.g. a logical OR may be used in which case the logic gates 608 are OR gates). A combination of bits in the challenge may be used to qualify the random data values that are permitted. When a random data value is disqualified, all zeros are used in place of the random data value. The outputs of the logic gates 608 pass to exclusive OR gates 610 as shown in FIG. 6. Thus, the zero position bits for all of the logic gates 608 outputs are exclusive ORed together, and the outputs for each successive bit position are exclusive ORed together to produce the result 612 that is n bits in length. Hence, the qualified random data values are permuted to produce the response, such as was discussed above relative to the tables of FIGS. 5A, 5B and 5C.

FIG. 7 shows an example of values for a portion of a random data array for use in the above described approach. In this example data array 700, 8 32 bit words are shown in hexadecimal format. Since this example uses 8 words, the challenge is 8 bits in length. The 32 bit words produce a 32 bit response. The lefthand column 702 is the address of each word in the array 700, and the righthand column 704 is the number of ones in each word.

Figure 8:
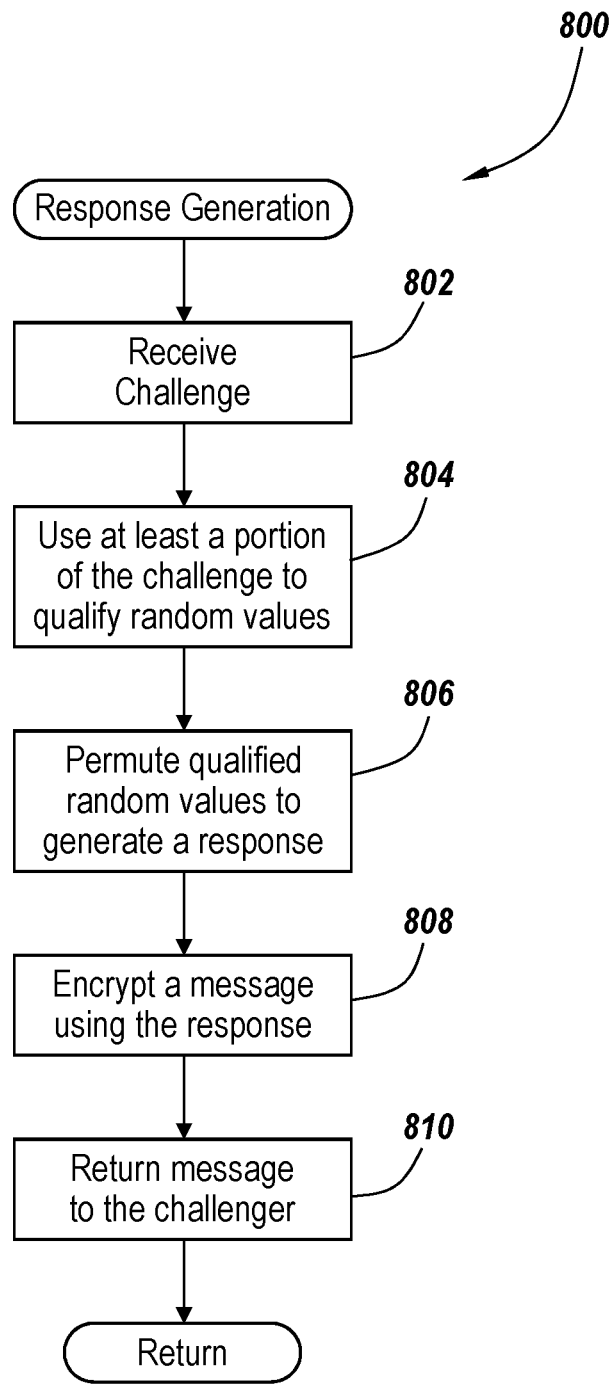
FIG. 8 provides a flow chart of the steps that may be performed in response generation.

FIG. 8 provides a flow chart 800 of the steps that are performed in an exemplary embodiment to generate a response. Initially, a challenge is received from a challenger (step 802). At least a portion of the challenge is then used to qualify random values (step 804). The qualified random data values are permuted to generate a response (step 806). The response may be used to encrypt a message as was described above (step 808). Then the message is returned to the challenger (step 810).

Figure 9:
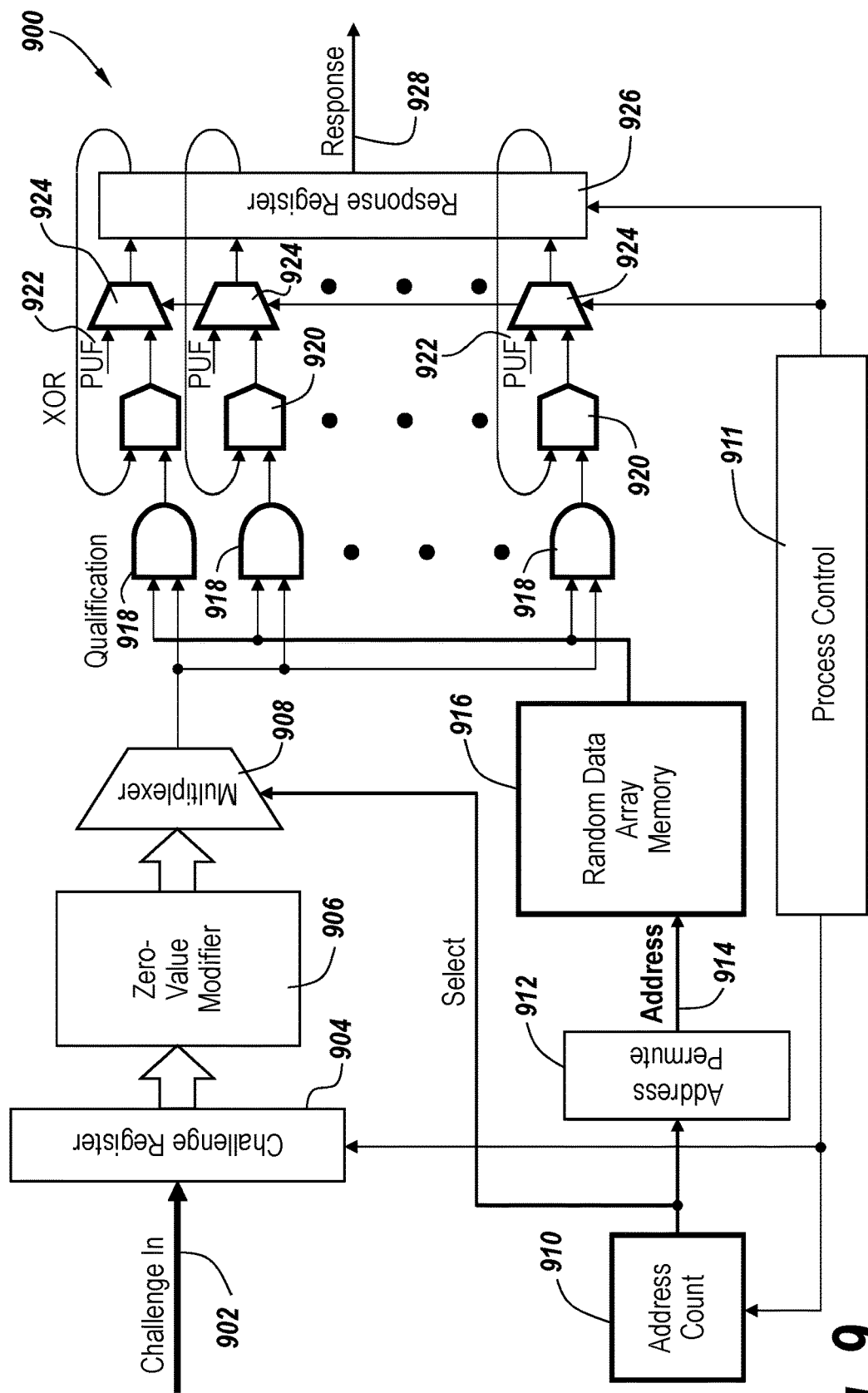
FIG. 9 provides a serial implementation of a response generator.

The response generator 600 described above relative to FIG. 6 uses a parallel approach. The approach instead may be serial. FIG. 9 shows a response generator 900 that adopts a serial approach. The challenge 902 is received and stored in a challenge register 904. The challenge register 904 is controlled via process control logic 911. The response generator 900 has a zero value modifier 906. The zero value modifier 906 deals with the possibility of a predictable all zeros response as a result of an all zero challenge. The zero value modifier 906 changes an all zero input to a non-zero input. Process control logic 911 clears an address counter 910 so that the system operates starting at address zero. The output from the address counter 900 acts as a select for the multiplexer 908. The multiplexer 908 selects among the bits of the challenge 902. Bits may be selected in sequence. Initially, the zero position bit is selected via the address computer 910. This results in the zero position bit of the challenge of being used to qualify the zeroth random word stored in the random data array memory 916. The zero count from the address counter 910 is used to select the appropriate address 914 in the random data array memory 916. The zeroth random data word is selected by the address permuter 912 which permutes the address counter value to select the proper random value from the random data array memory 916.

The qualification may be performed using AND gates 918 in a fashion like that described above relative to the parallel implementation but in a serial fashion. The qualification may instead be performed using OR gates or other methods. The zeroth data word is logically bit wise ANDed with the zero bit of the appropriate qualified challenge in the case shown in FIG. 9. This result is bit wise exclusive ORed with the data stored in the response register 926. Response register input mutliplexers 924 are set to select the exclusive OR result from the exclusive OR gates 920 so that the new data result is latched into the response register 926 and ultimately is used to produce the response 928. The implementation shows that the multiplexer 924 selects either the exclusive OR output or the output of a PUF 922.

Figure 10:
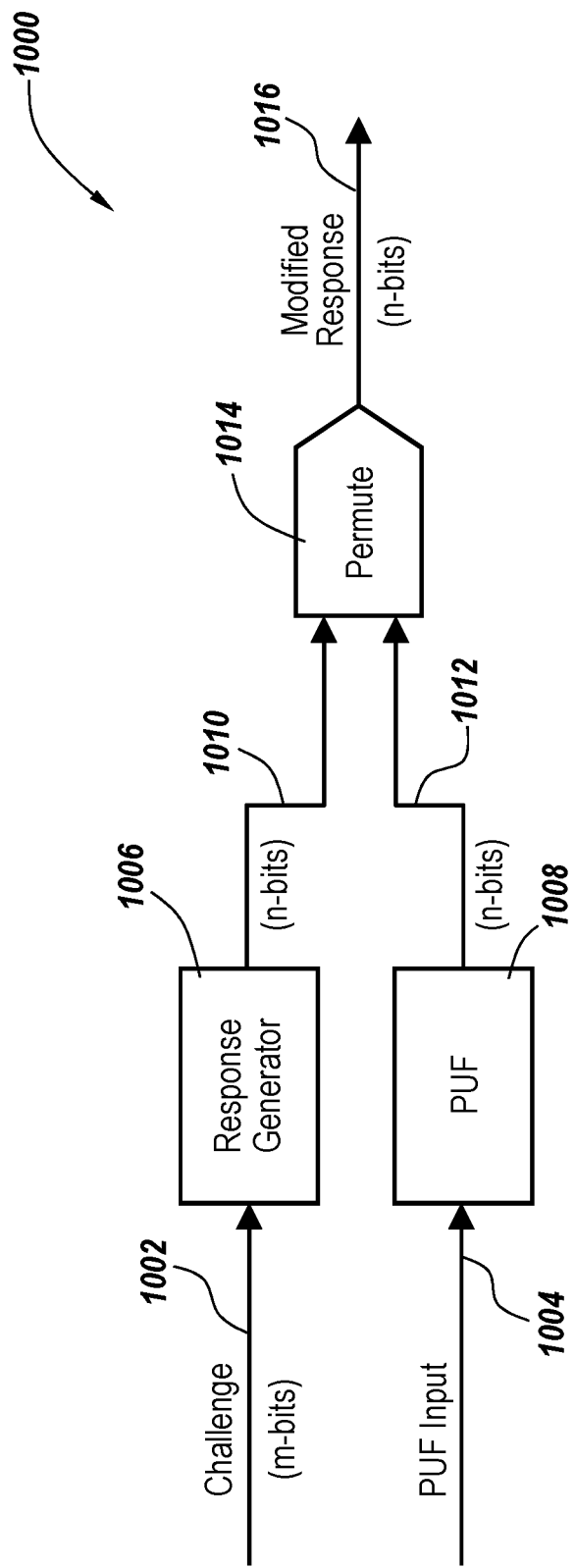
FIG. 10 illustrates an alternative embodiment in which the output from the response generator is permuted with the output of a PUF to generate the response.

In some exemplary embodiments, the response produced by the response generator need not be simply the output of the response generator but may be the result of permuting the response with another value as shown in the system 1000 of FIG. 10. In particular, the challenge 1002 is received by a response generator 1006 that generates a response 1010. This response 1010 is permuted by permuter 1014 with the output 1012 of a PUF 1008 that generates an output in response to an input 1004. The resulting modified response 1016 may be sent to the challenger. This permuting provides an extra layer of obfuscation for the response.

Figure 11:
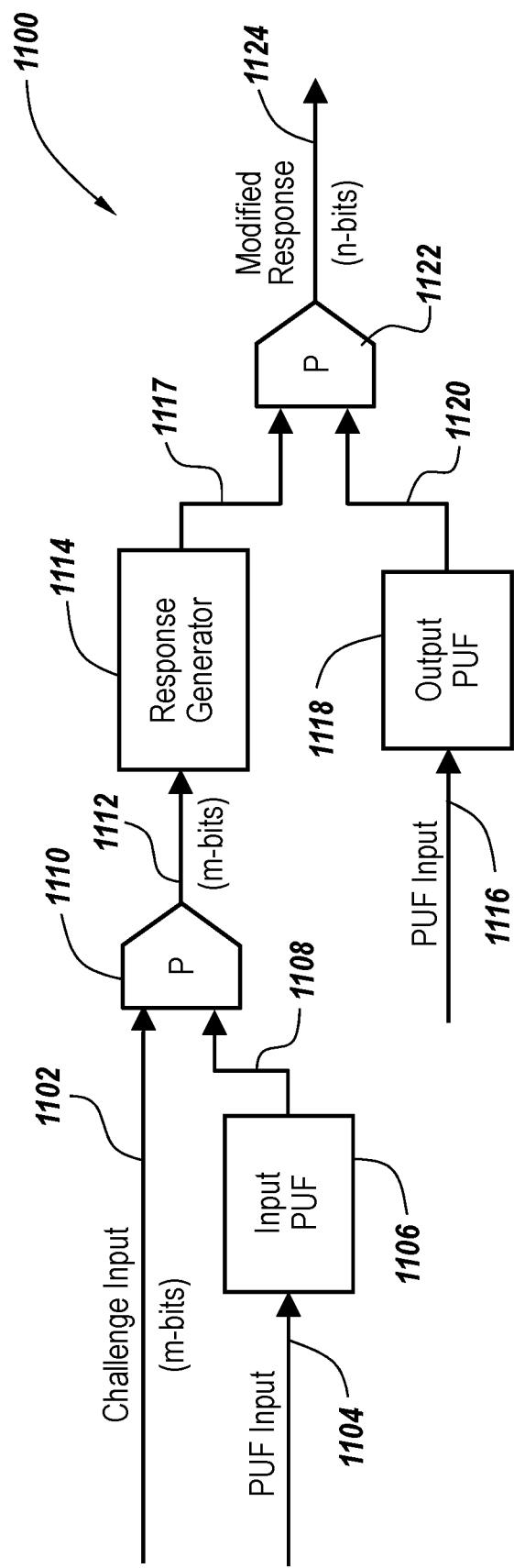
FIG. 11 illustrates an alternative embodiment in which the challenge input is permuted with the output of a PUF which serves as the input to the response generator where the result is permuted with the output of a PUF to generate a response.

FIG. 11 shows an example system 1100 wherein the input to the response generator 1114 is permuted, and the output is permuted to provide additional security. As shown in FIG. 11. The input PUF 1106 receives input 1104 and generates an output 1108 that is permuted by permuter 1110 with the challenge 1102. This permuted input 1112 is passed to the response generator 1114 that produces an output 1117. The output 1117 for the response generator 1114 is permuted with the output 1120 from an output PUF 1118. The output PUF 1118 generates output 1120 in response to an input 1116. The permuter 1122 generates the modified response 1124. The additional permutting helps to make the resulting response more difficult to dicipher and correlate with an input challenge.

Figure 12:
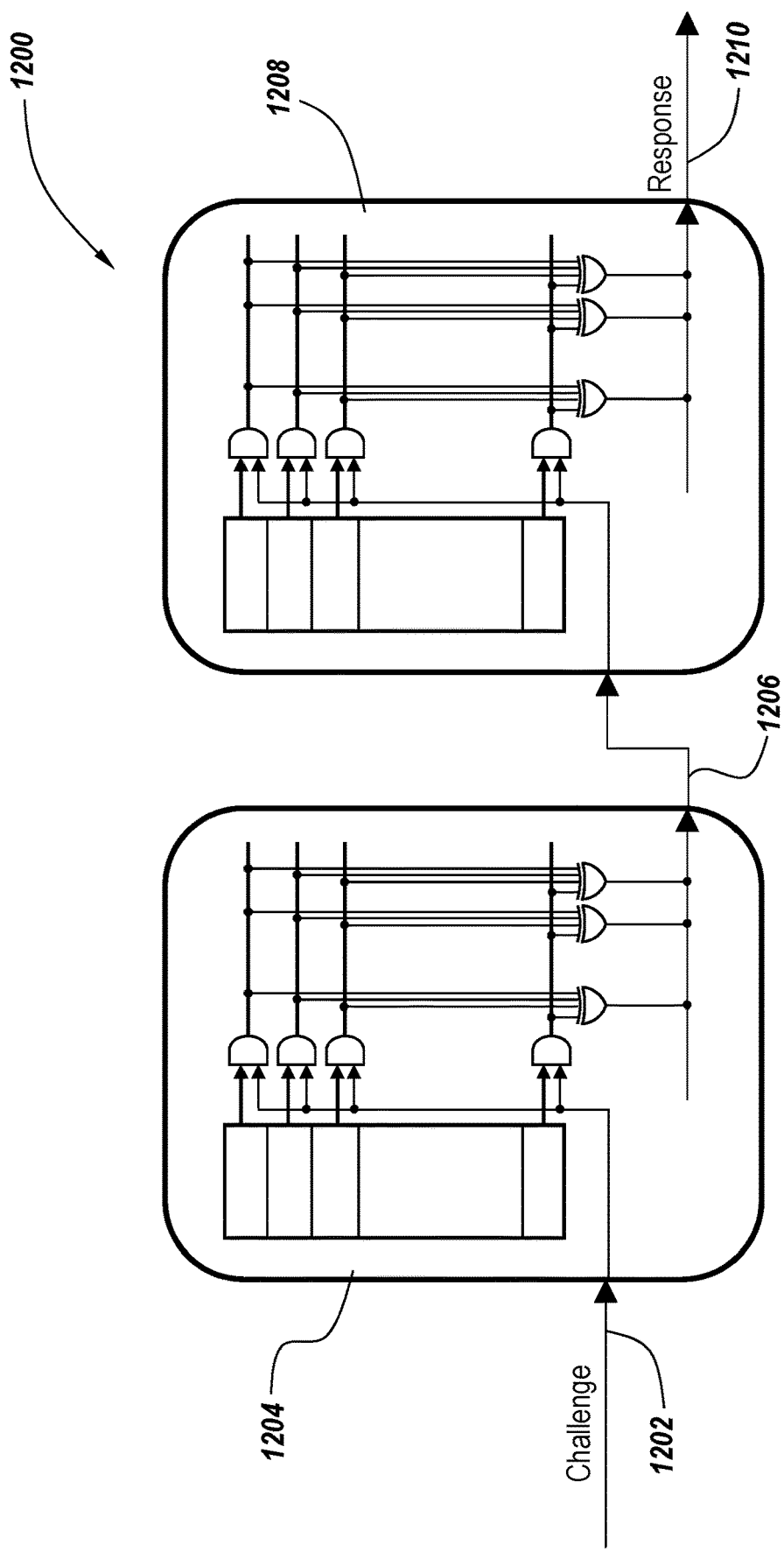
FIG. 12 shows an example where two response generators are positioned serially to generate a response.

The systems described herein need not be used in isolation but rather may be coupled together in a serial fashion such as shown in FIG. 12. In this example, the challenge 1202 is received by a first device 1204 that generates an output 1206 that serves as the input to a second device 1208 that generates the ultimate response 1210.

Figure 13:
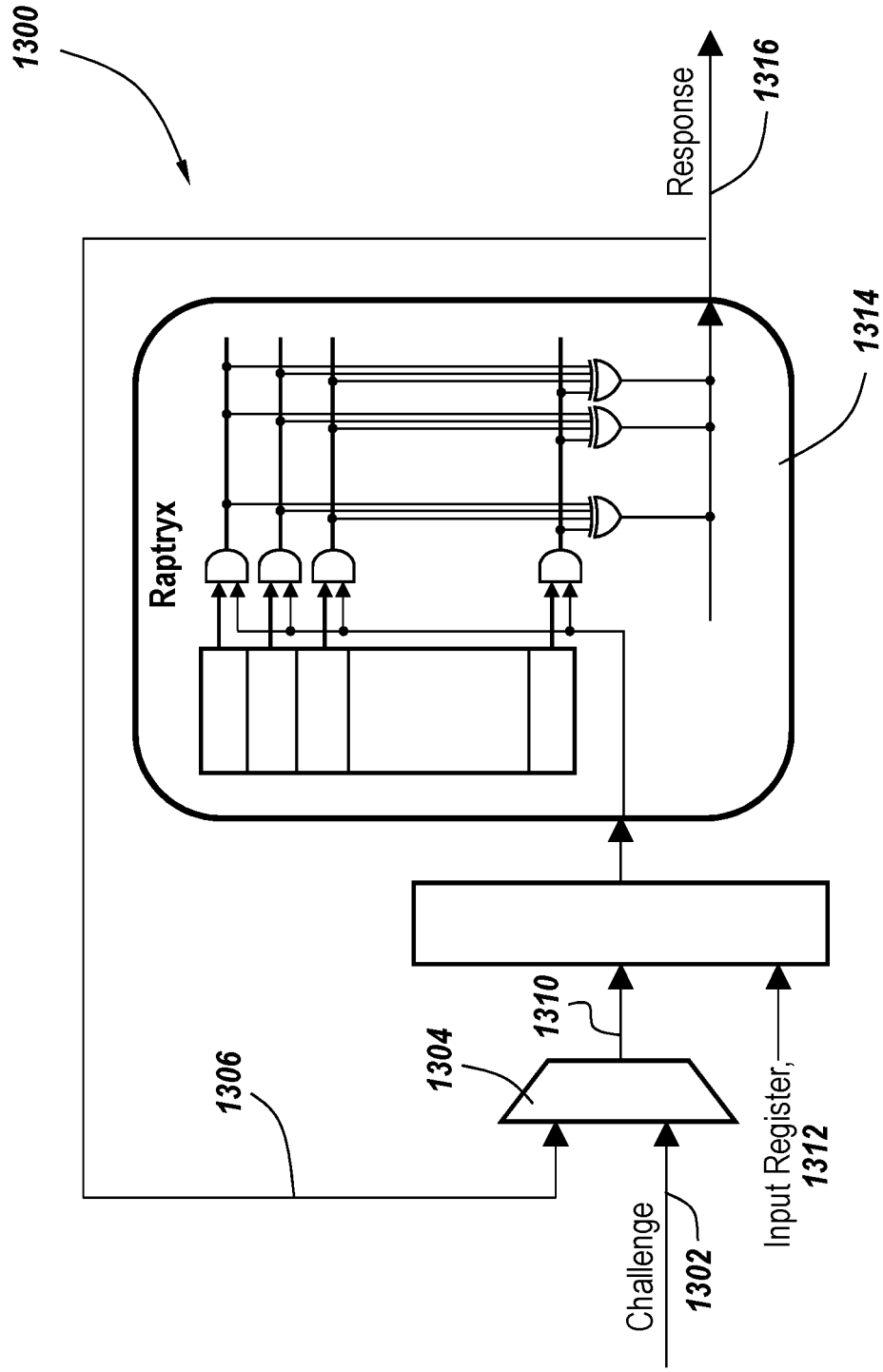
FIG. 13 shows a multi-pass response generator architecture.

A multi-pass device can be used with a single implementation with addition of an input register 1312 that is fed by a multiplexer 1304. The system 1300 of FIG. 13 receives the challenge 1302 and uses the multiplexer 1304 to select between the challenge 1302 and the feedback response 1306. The output 1310 for the multiplexer 1308 is passed to the input register 1312 and then passed into the device 1314 which generates the output response 1316.

The challenge/response system may be coupled to a non-linearization system to add further randomness to the response. S-boxes such as those employed by the AES encryption standard are one example of a non-linearization system that introduces non-linearaties. S-boxes provide a unique 8 bit output for each for 8 bit input. The S-boxes are based on a random function and not on a mathematical linear function. With an S-box, one S-box instance is required for every 8 bits of response.

Figure 14:
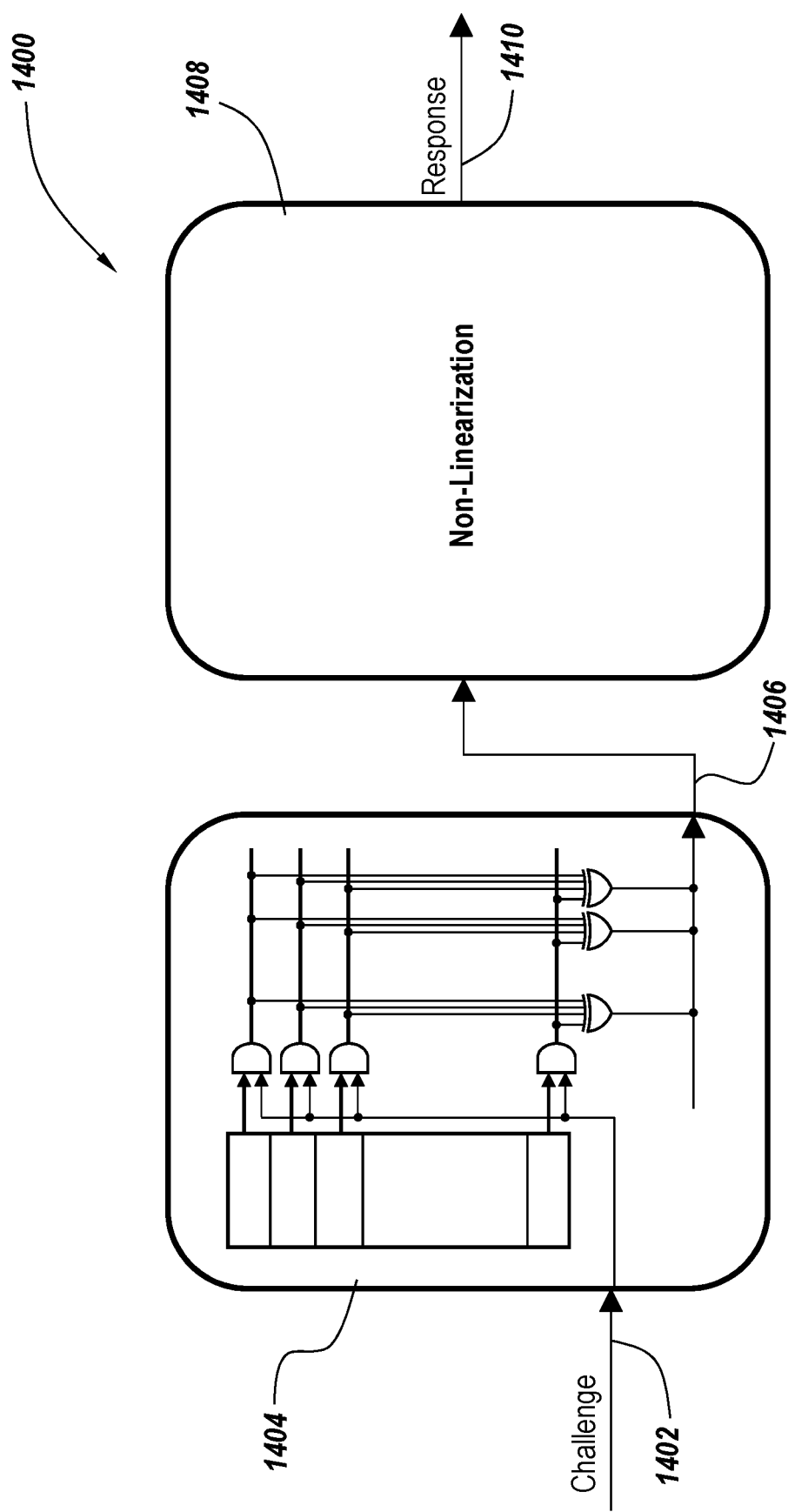
FIG. 14 shows an exemplary embodiment in which a non-linearization is applied to the response.

FIG. 14 shows an example of introduction of a non-linearization system in an exemplary embodiment. The system 1400 includes a challenge 1402 that is provided to a response generator 1404. The response generator generates a response 1406 such as discussed above. This response 1406 is input to the non-linearization system 1408. The non-linearization system introduces a non-linear response and outputs the resulting modified response 1410.

Figure 15:
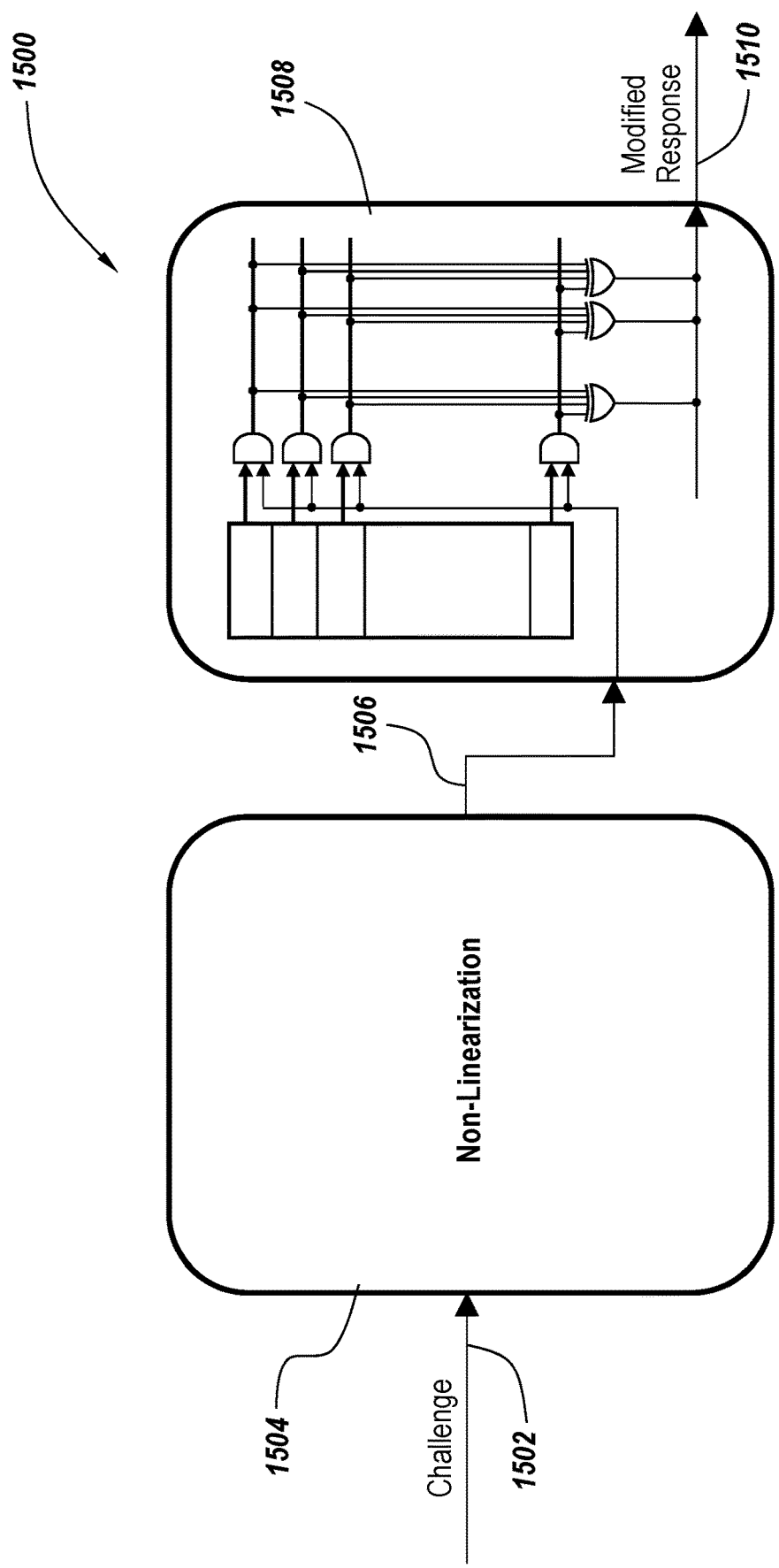
FIG. 15 shows an exemplary embodiment in a non-linearization is applied to the challenge.

The non-linearization may also may be applied to the challenge in exemplary embodiments. FIG. 15 shows a system 1500 in which a challenge 1502 is input into a non-linearization system 1504. The non-linearized output 1506 is input into a response generator 1508. The response generator 1508 generates a modified response 1510.

Figure 16:
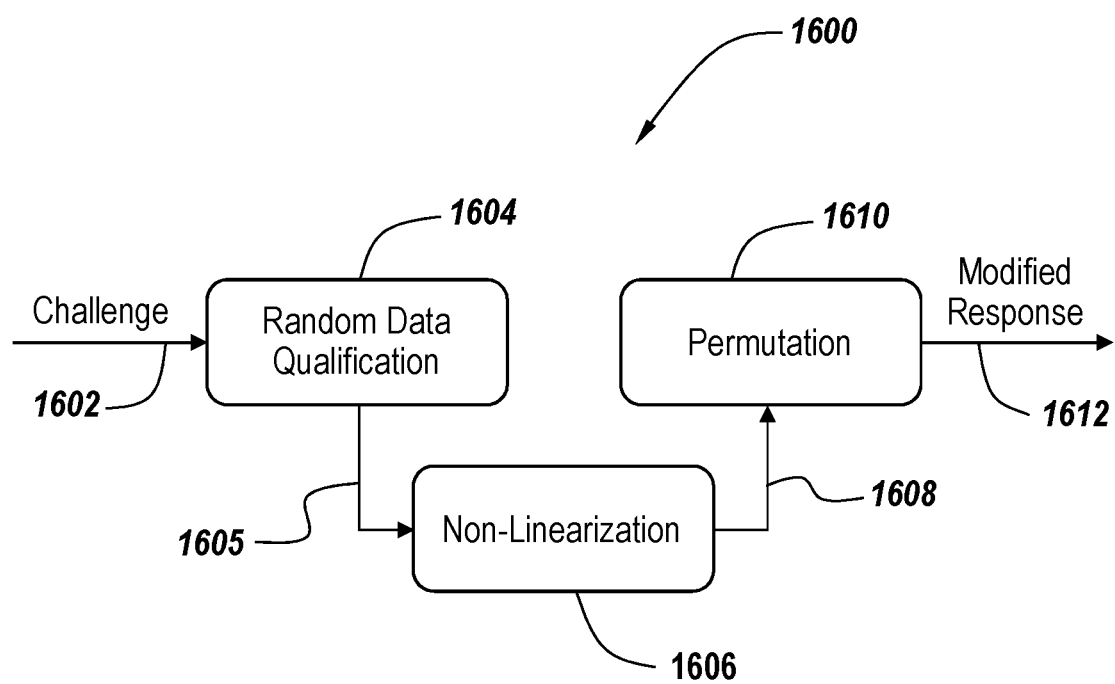
FIG. 16 shows an exemplary embodiment in which a non-linearization is applied after random data qualification but before permutation.

FIG. 16 shows the case with a non-linearization is performed within a response generator between the qualifying and permuting. The system 1600 for an exemplary embodiment receives a challenge 1602 and performs random data qualifications 1604 as discussed above. The resulting qualified data is input 1605 to a non-linearization system 1606. The non-linearized output 1608 is permuted by applying a permutation 1610 to generate a modified response 1612.

The non-linearization helps defend against certain types of cryptographic attack.

While the present invention has been described with reference to exemplary embodiments thereof, those skilled in the art will appreciate the various changes in the form and detail may be made without departing from the intended scope of the present invention as defined in the appended claims.

What is claimed as new and desired to be protected by Letters Patent of the United States is:

1. A method performed by a computational device as part of a challenge/response protocol, comprising:
   receiving a challenge at the computational device;
   using at least a portion of the challenge containing multiple bits to select which of the random values held in storage at the computational device are used as qualified random values in generating a response to the challenge, wherein each of the bits in the portion selects or omits a corresponding one of the random values held in the storage from use in generating the response and the-qualified random values are distinct values from the challenge;
   permuting the qualified random values to generate a response;
   encrypting a message using the response as an encryption key; and
   outputting the encrypted message from the computational device for a challenger in reply to the challenge.

2. The method of claim 1 wherein the permuting comprises
   permuting the permuted qualified random values with an additional value.

3. The method of claim 2 wherein the additional value is an output of a physically unclonable function.

4. The method of claim 2 wherein the permuting the qualified random values comprises performing an exclusive OR of the qualified random values.

5. The method of claim 2 wherein the permuting the qualified random values comprises adding the qualified random values.

6. The method of claim 1 further comprising modifying the challenge to another value if the challenge has a zero value.

7. The method of claim 1 further comprising permuting the encrypted message with an output of a physically unclonable function and wherein the outputting the encrypted message comprises outputting the permuted encrypted message.

8. The method of claim 1 wherein bits of the challenge are logically ANDed with bits of the random values to perform the selecting of the random values.

9. The method of claim 1 wherein bits of the challenge are logically ORed with bits of the random Values to perform the selecting of the random values.

10. The method of claim 1 wherein the computational device includes hardware logic and wherein the qualifying, the permuting and the outputting are performed by the hardware logic.

11. The method of claim 1 further comprising applying a nonlinearization to the response and wherein the encrypting uses the response after the non-linearization is applied as the encryption.

12. The method of claim 1 further comprising applying a nonlinearization to the challenge and wherein the using at a portion of the challenge uses at least a portion of the challenge after the non-linearization is applied.

13. The method of claim 1 further comprising applying a nonlinearization to the qualified random values and wherein the permuting is performed after the non-linearization is applied.

14. A non-transitory computer-readable storage media holding instructions that when executed on processing logic perform the following:
   receive a challenge at a computational device;
   use at least a portion of the challenge containing multiple bits to select which of the random values held in storage at the computational device are used as qualified random values in generating a response to the challenge, wherein each of the bits in the portion selects or omits a corresponding one of the random values held in the storage from use in generating the response and the qualified random values are distinct values from the challenge;
   permute the qualified random values to generate a response;
   encrypt a message using the response as an encryption key; and
   output the encrypted message from the computational device for a challenger in reply to the challenge.

15. The non-transitory computer-readable storage medium of claim 14 wherein the permuting comprises permuting the permuted qualified random values with an additional value.

16. The non-transitory computer-readable storage medium of claim 14 wherein the additional value is an output of a physically unclonable function.

17. The non-transitory computer-readable storage medium of claim 14 wherein the permuting the qualified random values comprises performing an exclusive OR of the qualified random values.

18. The non-transitory computer-readable storage medium of claim 14 wherein the permuting the qualified random values comprises adding the qualified random values.

19. The non-transitory computer-readable storage medium of claim 14 further storing instructions for modifying the challenge to another value if the challenge has a zero value.

20. The non-transitory computer-readable storage medium of claim 14 further storing instructions for applying a non-linearization to the response and wherein the encrypting uses the response after the non-linearization is applied as the encryption key.

21. The non-transitory computer-readable storage medium of claim 14 further storing instructions for applying a non-linearization to the challenge and wherein the using the challenge uses the at least a portion of the challenge after the non-linearization is applied.

22. The non-transitory computer-readable storage medium of claim 14 wherein bits of the challenge are logically ANDed with bits of the random values to perform the selecting of the random values.

23. The non-transitory computer-readable storage medium of claim 14 wherein bits of the challenge are logically ORed with bits of the random values to perform the selecting of the random values.

24. The non-transitory computer-readable storage medium of claim 14 further storing instructions for applying a non-linearization to the qualified random values and wherein the permuting is performed after the non-linearization is applied.

25. A device, comprising:
storage for storing random values;
processing logic for:
receiving a challenge;
using at least a portion of the challenge containing multiple bits to select which of the random values stored in the storage are used as qualified random values in generating a response to the challenge, wherein each of the bits in the portion selects or omits a corresponding one of the random values held in the storage from use in generating the response and the qualified random values are distinct values from the challenge;
permuting the qualified random values to generate a response; encrypting a message using the response as an encryption key; and
outputting the encrypted message to a challenger in reply to the challenge.

26. The device of claim 25, wherein the processing logic comprises a microprocessor.

27. The device of claim 25, wherein the processing logic comprises a field programmable gate array.

28. The device of claim 25, wherein the processing logic comprises an application specific integrated circuit.

29. The device of claim 25 wherein the permuting comprises permuting the permuted qualified random values with an additional value.

30. The device of claim 29 wherein the additional value is an output of a physically unclonable function.

31. The device of claim 29 wherein the permuting the qualified random values comprises performing an exclusive OR of the qualified random values.

32. The device of claim 29 wherein the permuting the qualified random values comprises adding the qualified random values.

33. The device of claim 29 wherein the processing logic is for applying a non-linearization to the response and wherein the encrypting uses the response after the nonlinearization is applied as the encryption key.

34. The device of claim 29 wherein the processing logic is for applying a non-linearization to the challenge and wherein the using at least a portion of the challenge uses at least a portion of the challenge after the non-linearization is applied.

35. The device of claim 29 wherein the processing logic is for applying a non-linearization to the qualified random values and wherein the permuting is performed after the nonlinearization is applied.

36. The device of claim 29 wherein bits of the challenge are logically ANDed with bits of the random values to perform the selecting of the random values.

37. The device of claim 29 wherein bits of the challenge are logically ORed with bits of the random values to perform the selecting of the random values.

* * * * *